(No Model.)

L. PAYETTE.
BICYCLE TIRE.

No. 581,008. Patented Apr. 20, 1897.

WITNESSES:
Wm. D. Bell.
S. D. Rumsey

INVENTOR:
Louis Payette
BY Gartner &co
ATTORNEYS.

UNITED STATES PATENT OFFICE.

LOUIS PAYETTE, OF PATERSON, NEW JERSEY.

BICYCLE-TIRE.

SPECIFICATION forming part of Letters Patent No. 581,008, dated April 20, 1897.

Application filed August 27, 1896. Serial No. 604,065. (No model.)

*To all whom it may concern:*

Be it known that I, LOUIS PAYETTE, a subject of the Queen of Great Britain, residing in Paterson, county of Passaic, and State of New Jersey, have invented certain new and useful Improvements in Bicycle-Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my present invention is to provide a hollow bicycle-tire to take the place of the pneumatic tire, and which tire, even when punctured, will not collapse, of simple, strong, and durable construction, light in weight, and reliable in use.

The invention consists in the improved hollow bicycle-tire, its auxiliary metallic spring-tire, and in the combination and arrangement of the various parts thereof, substantially as will be hereinafter more fully described, and finally embodied in the clauses of the claim.

Figure 1:
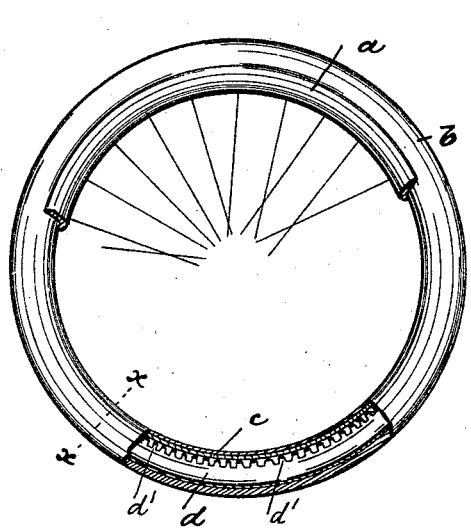
Figure 2:
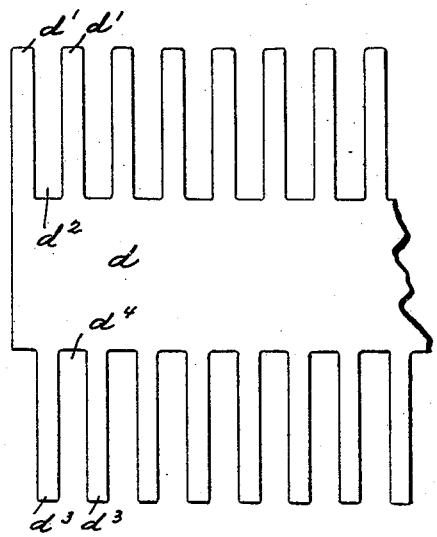
Figure 3:
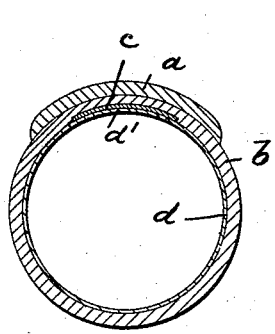
Figure 4:
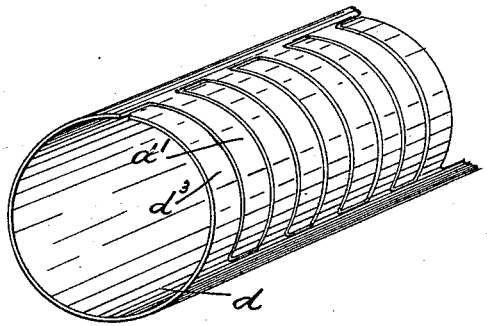

In the accompanying drawings, Figure 1 is a side elevation of a bicycle-wheel provided with my improvements, certain portions being broken away and others removed to better illustrate the nature of my said invention; Fig. 2, an enlarged top plan view of a portion of the metallic spring-tire when flattened or opened out; Fig. 3, an enlarged sectional view on the line $x\ x$ of Fig. 1; Fig. 4, a detail perspective view of a portion of the metallic spring-tire; and Fig. 5, a sectional view similar to Fig. 3, illustrating a modification thereof.

In said drawings, $a$ represents the rim of a bicycle-wheel, and $b$ a hollow tire made of rubber or any other suitable flexible material. Within said hollow tire is arranged the auxiliary spring-tire $d$, consisting of a metal plate provided at its longitudinal edges with a series of fingers $d'$ and $d^3$, forming openings $d^2$ and $d^4$, respectively. Said openings are substantially of the shape of the fingers, but slightly larger than the same. The plate $d$ is bent into a circular shape to conform to the shape of the elastic tire, and when so arranged the fingers of one side will engage the openings formed by the fingers of the other side, and vice versa, as clearly shown in Fig. 4 of the drawings. The solid portion of said spring-tire bears against the inner surface of the elastic tire, while the fingers bear against a metal strip $c$, arranged within said elastic tire parallel with the rim $a$ and of a width to cover the central portion of the latter. This metal strip acts as a protector for the elastic tire, as otherwise the fingers would continually cut into and thus destroy the same.

Figure 5:
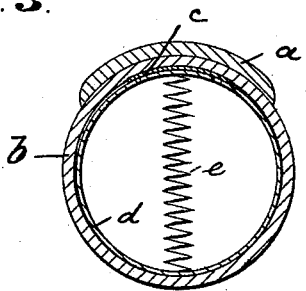

In Fig. 5 of the drawings is illustrated a slight modification of my improved tire, which modification consists in a series of spiral springs $e$, arranged at right angles to the rim $a$ and bearing with their outer ends against the solid portion of the spring-tire and with their inner ends against the respective fingers of the latter. By this arrangement additional strength and elasticity are given to the tire, as will be manifest.

I do not intend to limit myself to the precise construction shown and described, as various changes can be made without changing the scope of my invention.

What I claim as new, and desire to secure by Letters Patent, is—

1. A bicycle-tire, consisting of a hollow elastic tire, of an open auxiliary metallic spring-tire arranged within said elastic tire and conforming to the shape of the latter, and of a metal strip arranged between the elastic tire and the metallic tire, substantially as and for the purposes described.

2. A bicycle-tire, consisting of a hollow elastic tire and of a metallic plate arranged within said tire and bent to conform to the shape thereof, said metallic plate being provided at its longitudinal edges with projecting fingers forming openings, which fingers and openings on one edge are alternately arranged with the fingers and openings on the other edge and are adapted to engage with each other, substantially as and for the purposes described.

3. A bicycle-tire, consisting of a hollow elastic tire, of a metallic plate arranged within said tire and bent to conform to the shape thereof, said metallic plate being provided at its longitudinal edges with projecting fingers forming openings, which fingers and openings on one edge are alternately arranged with the fingers and openings on the other edge and are adapted to engage with each other, and a metal strip between the elastic tire and the fingers of the metallic plate, substantially as and for the purposes described.

4. A bicycle-tire, consisting of a hollow elastic tire, of an open auxiliary metallic spring-tire within said elastic tire and conforming to the shape of the same, a metal strip between said tires and covering the opening of the metallic spring-tire, and a series of spiral springs within the metallic tire and at right angles to the metal strip, substantially as and for the purposes described.

In testimony that I claim the foregoing I have hereunto set my hand this 19th day of August, 1896.

LOUIS PAYETTE.

Witnesses:
ALFRED GARTNER,
S. D. RUMSEY.